United States Patent [19]

Butterfield et al.

[11] Patent Number: 4,660,598

[45] Date of Patent: Apr. 28, 1987

[54] DIAPHRAGM-TYPE ANTIDRIP VALVE

[75] Inventors: Ted Butterfield; Stephen C. Reif, both of Naperville, Ill.

[73] Assignee: Spraying Systems Co., Wheaton, Ill.

[21] Appl. No.: 818,210

[22] Filed: Jan. 13, 1986

[51] Int. Cl.[4] .............................................. F16K 31/12
[52] U.S. Cl. .................................... 137/510; 251/331; 92/98 R
[58] Field of Search ....................... 137/510; 251/331; 92/98 R; 239/533, 15

[56] References Cited

U.S. PATENT DOCUMENTS

| | | | |
|---|---|---|---|
| 2,686,533 | 8/1954 | Grutzmuller | 137/510 |
| 2,748,797 | 6/1956 | Heizer | 137/510 |
| 2,895,497 | 7/1959 | Jones | 251/331 X |
| 3,149,542 | 9/1964 | Cruse | 92/98 R X |
| 3,529,622 | 9/1970 | Weise | 137/510 X |
| 3,762,681 | 10/1973 | McKinney | 137/510 X |
| 3,863,841 | 2/1975 | Berthoud | 137/510 X |
| 3,980,273 | 9/1976 | Turner | 92/98 R X |

Primary Examiner—Harold W. Weakley
Attorney, Agent, or Firm—Leydig, Voit & Mayer

[57] ABSTRACT

An improved diaphragm-type antidrip valve including a valve body defining an annular valve chamber having a fluid inlet and an axial fluid outlet defined by a centrally located valve tube with a diaphragm element having its peripheral portion held in sealing engagement against the outer end of the valve chamber by an end cap and its front face disposed for sealing engagement with the open end of the valve tube, wherein the diaphragm is formed with a centrally located button projecting axially from its rear face and received and radially supported in a socket in a valve follower slidably mounted in the end cap and biased towards closed position by a compression spring and the end cap including an annular contoured ramp presenting a concave seat adjacent the effective outer periphery of the diaphragm for radially and axially supporting the diaphragm in its open position.

7 Claims, 2 Drawing Figures

DIAPHRAGM-TYPE ANTIDRIP VALVE

FIELD OF THE INVENTION

The present invention relates generally to antidrip valves for spray nozzles and the like, and more particularly concerns an improved diaphragm-type cut off valve which effectively prevents dripping under the various conditions of spray nozzle use.

BACKGROUND OF THE INVENTION

One problem associated with spray nozzles and the like is the tendency for fluid to drip from the nozzle after the supply of pressurized fluid has been shut off. In an effort to prevent this, diaphragm valves have been developed and used in the past. U.S. Pat. No. 2,639,194 to Wahlen discloses a diaphragm-type antidrip valve for spray nozzles which over the years has met with considerable success, particularly for use in moderate to medium pressure spraying systems. At higher pressures, however, and when subjected to large numbers of on-off pressure cycles, the diaphragm elements in such valves tend to stretch out of shape and become somewhat erratic and unreliable in providing an effective shut off seal.

OBJECTS OF THE INVENTION

Accordingly, it is the primary aim of the present invention to provide an improved diaphragm-type antidrip valve which is effective under high pressure operation and frequent duty cycles to establish and maintain positive shut off conditions and prevent unnecessary dripping from the spray nozzle. A more specific object is to provide an antidrip valve of the foregoing type in which the diaphragm element is substantially completely supported both axially and radially by a conforming back-up plunger to prevent the diaphragm from being stretched out of shape under high pressure operating conditions. It is a further and more detailed object to provide such a valve which permits the diaphragm to be made of a relatively inexpensive and unreinforced elastomer material.

These and other objects and advantages of the invention will become more readily apparent from reading the following detailed description and upon reference to the drawings, in which:

Figure 1:
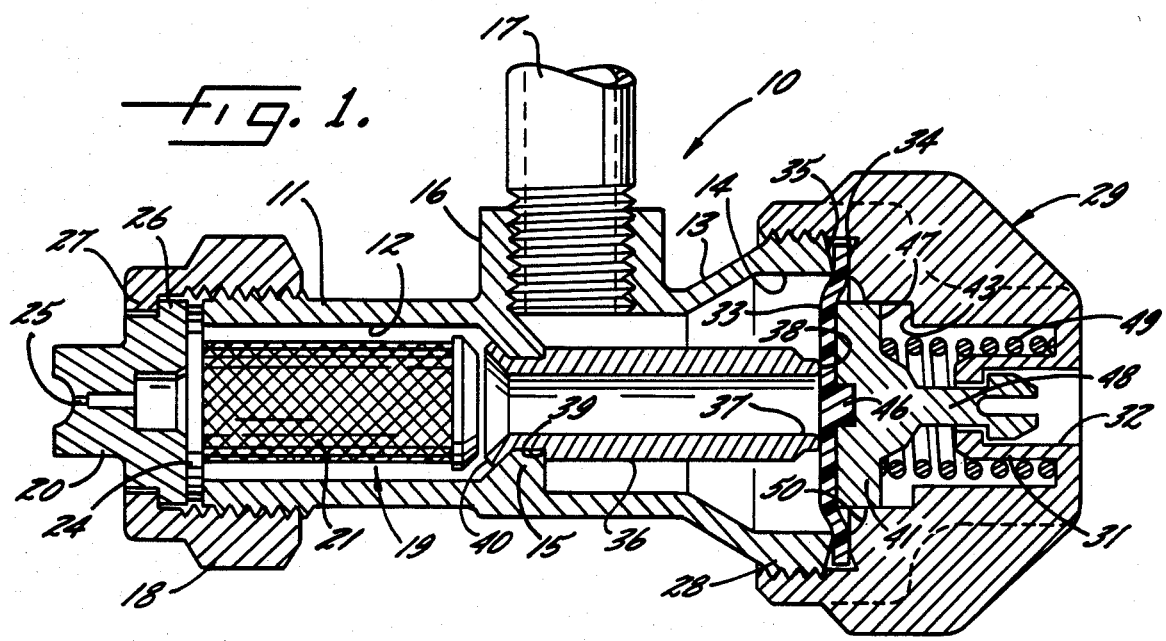
FIG. 1 is a longitudinal view, mostly in vertical section, of the improved diaphragm-type antidrip valve of the present invention associated with a high pressure spray nozzle and wherein the diaphragm is shown in its shut-off position; and, FIG. 2 is an enlarged fragmentary section of the diaphragm valve of FIG. 1 with the diaphragm urged to its open but fully supported position.

While the invention is susceptible of various modifications and alternative constructions, a preferred embodiment has been shown in the drawings and will be described further below in detail. It should be understood, however, that there is no intention to limit the invention to the specific embodiment illustrated and described but, on the contrary, the intention is to cover all modifications, alternative constructions and equivalents as fall within the spirit and scope of the invention.

DESCRIPTION OF THE PREFERRED EMBODIMENT

Turning now to the drawings, there is shown in FIG. 1, a combination spray nozzle and valve body indicated generally at 10. The combination body 10 has a generally cylindrical nozzle end portion 11 with a strainer chamber 12 at one end and an enlarged annular valve chamber 14 at the other end.

The strainer chamber 12 and valve chamber 14 are separated from one another by a centrally apertured partition 15 located in the central portion of the body 10. To supply fluid to the spray nozzle, an internally threaded hub 16 extends laterally from the body 10 near its middle for attachment of a pipe 17 or the like through which fluid is supplied under pressure.

In the illustrated embodiment, the nozzle end portion 11 of the body 10 is externally threaded at its outer end for receiving an internally threaded clamping ring 18 which secures a strainer assembly 19 in the strainer chamber 12 and a nozzle tip 20 to the outer end of the nozzle end portion 11. The strainer assembly 19 includes a cylindrical strainer 21 mounted on an internal strainer support having an annular flange 24 clamped between the nozzle tip 20 and the outer nozzle end portion 11 by the clamp ring 18.

The nozzle tip 20 has a central orifice 25 through which liquid is discharged in a spray pattern and the base of the tip has an annular flange 26 which is engaged by an internally projecting flange 27 of the clamping ring 18 for clamping the nozzle tip against the annular flange 24 of the strainer holder and against the nozzle end portion 11 to provide a sealed connection between these parts. It will be understood that liquid supplied under pressure to the strainer chamber 12 is forced through the strainer 21 into the interior thereof and outwardly therefrom through an opening in the flanged end 24 of the strainer body into a discharge passageway leading to the spray orifice 25 in the nozzle tip.

The enlarged portion 13 at the other end of the body 10 is also externally threaded at its outer end 28 for receiving an internally threaded cap 29. Preferably, the cap 29 is formed with scalloped recesses (as shown in dash lines) around its outer periphery to facilitate gripping and turning the cap by hand. The outer end of the cap 29 is formed with a centrally located, inwardly extending guide sleeve 31 having a stepped internal bore 32.

Pursuant to the present invention, an improved diaphragm valve element 33 is secured on the outer end of the flared portion 13 by the cap 29 with the periphery of the diaphragm clamped between an internal shoulder 34 in the cap 29 and the outer end face 35 of the flared portion 13. Preferably, both the internal cap shoulder 34 and outer end face 35 of the flared portion 13 are beveled or tapered outwardly away from one another in order to insure tight clamping and sealing contact against the opposite faces of the diaphragm element 33.

Secured in the central aperture of the partition 15 is valve tube 36 which extends axially into the annular valve chamber 14 and has an open end 37 with a rounded lip 38 for sealing engagement by the central portion of the diphragm element 33. Preferably, the other end of the valve tube 36 is provided with an annular shoulder 39 abutting one face of the partition 15 and an open end 40 flanged or otherwise tightly secured against the other face of the partition 15. It will be understood, of course, that the tube 36 could be externally threaded at its attachment end 40 to be screwed into a complementary internally threaded aperture in the partition 15, if desired.

In accordance with the present invention, means are provided for radially and axially supporting the diaphragm element 33 in both its open and closed positions. To this end, a valve follower 41 is slidably received in an annular recess 42 terminated by a shoulder 43 in the cap 29. Preferably, the face 44 of follower 41 is substantially flat for supporting the diaphragm axially and is formed with a central socket 45 for receiving and radially supporting an axially extending button 46 formed integrally on the rear face of the diaphragm element 33. The base of the follower 41 is formed with a peripheral shoulder 47 for engaging the shoulder 43 in the cap 29 and an axially extending stem 48 slidably mounted in the stepped internal bore 32 of the cap guide sleeve 31. A compression spring 49 surrounds the guide sleeve 31 and bears against the shoulder 47 on the follower 41 to urge the diaphragm 33 firmly and sealingly against the rounded lip 38 of the valve tube 36 when pressurized fluid is not being delivered to the valve body 10 through the inlet pipe 17. The positive engagement of the diaphragm 33 with the lip 38 is such that fluid flow through the valve tube 36 and nozzle orifice 25 is terminated almost immediately upon turning off the fluid at the pressure source, thus substantially eliminating fluid dripping from the nozzle tip 20.

Figure 2:
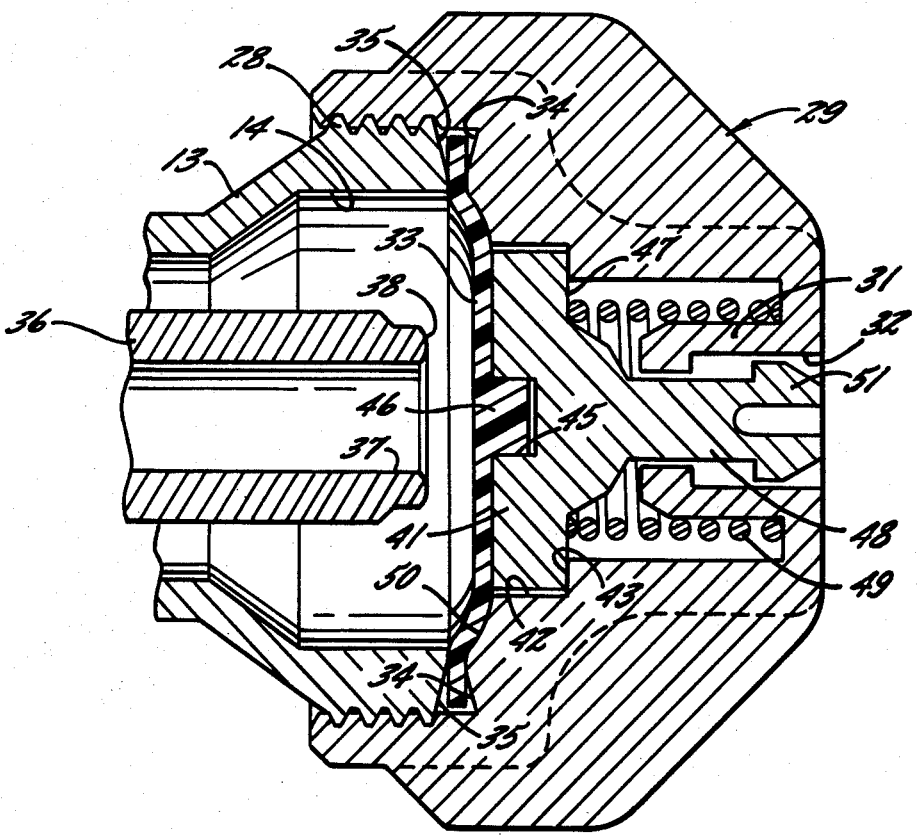

When fluid under pressure is delivered to the valve body 10 through the inlet pipe 17, the pressurized fluid in the valve chamber 14 urges the diaphragm element 33 away from the open end 37 of the tube 36 and fluid is directed through the tube 36, the strainer 21 and out through the orifice 25 of the nozzle tip 20. Pursuant to a further aspect of the invention, the rear face of the diaphragm 33 is substantially completely supported when the diaphragm is urged by fluid pressure to its open position, as shown in FIG. 2. To this end, the cap 29 is formed with an annular contoured ramp 50 presenting a concave seat extending between the cap clamping shoulder 34 and the cap recess 42. Preferably, the depth of the concave seat 50 is substantially equal to the thickness of the diaphragm 33 and thus prevents undue stretching and distortion of the diaphragm even when subjected to high fluid pressure. Moreover, the complementary convex curved contour of the inner face of the diaphragm adjacent its effective outer periphery defines a substantially torroidal-shaped entrance chamber adjacent the open end 37 of the valve tube 36. This promotes the flow of fluid into the tube 36.

In order to retain the valve follower 41 and spring 49 in the cap 29 when the cap is unscrewed from the enlarged end 13 of the valve body 10, the stem 48 is preferably upset or otherwise formed with a mushroom shaped end 51 within the enlarged portion of the stepped bore 32. It will also be understood that inserting the button 46 in the socket 45 assists in holding and properly centering the diaphragm 33 during installation of the cap 29 on the valve body 10.

From the foregoing, it will be seen that the improved button shaped diaphragm 33 and contoured valve follower 41 of the present invention provides for substantailly drip free operation and extended diaphragm life over many on-off cycles even at high pressure by substantially eliminating stretching and undue distortion of the diaphragm during repeated flexing. The diaphragm element 33 may, therefore, be made of a relatively inexpensive and unreinforced polymeric material such as polyethylene, polypropylene or the like which is impermeable to air and liquid and inert to the fluid to be sprayed. For especially reactive or corrosive fluids, the diaphragm may be molded or otherwise formed from specially formulated polytetrafluoroethylene compounds.

We claim as our invention:

1. An improved diaphragm-type antidrip valve comprising in combination, a valve body defining an annular valve chamber having a fluid inlet and an axial fluid outlet defined by a centrally located valve tube, a diaphragm having its peripheral portion held in sealing engagement against the outer end of the valve chamber by an end cap and its front face disposed for sealing engagement with the open end of said valve tube, said diaphragm formed with a substantially centrally located button projecting axially from its rear face and a peripheral web portion of substantially uniform thickness extending radially outwardly from said button, said end cap formed with an annular internal shoulder for engaging the peripheral web portion of said diaphragm element and said internal cap shoulder and said outer end of said valve chamber being tapered outwardly away from one another to insure tight clamping and sealing contact against the opposite faces of the peripheral web portion of said diaphragm element, a valve follower slidably received in an annular recess in said end cap and formed with a substantially flat face engaging the rear face of said diaphragm and a central socket for receiving and radially supporting said button, means including a compression spring seated in said cap and engaging said valve follower for urging said diaphragm into sealing engagement with the open end of said valve tube, said end cap also being formed radially inwardly of said shoulder with an annular contoured ramp presenting a concave seat adjacent the effective outer periphery of said diaphragm for radially and axially supporting said diaphragm when moved by pressurized fluid away from the open end of said valve tube and such that the contour of the inner face of said diaphragm element when urged against said concave seat partially defines a substantially torroidal-shaped entrance chamber adjacent the open end of said valve tube.

2. An improved diaphragm-type antidrip valve as defined in claim 1 wherein said valve follower is formed with a rearwardly projecting stem, and said cap carries a guide sleeve having an internal bore in which said stem is slidably received.

3. An improved diaphragm-type antidrip valve as defined in claim 2 wherein said internal bore has an outwardly enlarged stepped portion and said stem is formed with mushroom shaped end portion disposed within said enlarged portion of said stepped bore.

4. An improved diaphragm-type antidrip valve as defined in claim 2 wherein said valve follower is formed with an annular shoulder on its rear face and a compression spring surrounds said guide sleeve and bears against said follower shoulder to urge said diaphragm firmly and sealingly against the open end of said valve tube when the fluid in said valve chamber is not pressurized.

5. An improved diaphragm-type antidrip valve as defined in claim 1 wherein the diameter of said diaphragm button is less than the internal diameter of the open end of said valve tube.

6. An improved diaphragm-type antidrip valve as defined in claim 1 wherein the depth of said concave seat is substantially equal to the thickness of the peripheral web portion of said diaphragm element.

7. An improved diaphragm-type antidrip valve as defined in claim 1 wherein said diaphragm element is formed of a polymeric material such as polyethylene, polypropylene and polytetrafluoroethylene.

* * * * *